Aug. 30, 1955     S. BECKWITH     2,716,727

EXCITATION AND REGULATING SYSTEM FOR ALTERNATORS

Filed Dec. 26, 1952

Inventor
Sterling Beckwith
by T. Lloyd La Frane
Attorney

United States Patent Office 2,716,727
Patented Aug. 30, 1955

2,716,727

EXCITATION AND REGULATING SYSTEM FOR ALTERNATORS

Sterling Beckwith, Lake Forest, Ill., assignor to Allis-Chalmers Manufacturing Company, Milwaukee, Wis.

Application December 26, 1952, Serial No. 328,104

8 Claims. (Cl. 322—28)

This invention relates to an excitation system for an alternating current dynamoelectric machine and more particularly to an improved excitation and regulating system for alternating current electric generators.

A conventional excitation and regulating system for alternators generally includes a direct current dynamoelectric machine for supplying the excitation current to the field winding of the alternator. The direct current machine requires a commutator and slip rings adding materially to the complexity of the system and to the cost of its maintenance. Moreover, the standard nominal response of such exciters is relatively slow.

Other known excitation and regulating systems include static inductive devices for directly exciting the field of the alternator by direct current supplied through rectifiers from the alternating current circuit of the alternator. Such systems for the direct or self-excitation of the alternator have not been commercially adopted to any appreciable extent, and existing applications apparently have been limited to relatively small capacity machines. Larger static devices are required for the larger capacity alternators in order to supply excitation current thereto between the required greater range of values. Since the time constant of a static device such as a reactor is the ratio of its reactance to its resistance, the time constant of a reactor may be considered as generally proportional to its size. For large alternators, therefore, the static devices have greatly increased time constants, resulting in a system response which is relatively slow.

The slow speed of response is not obviated by an excitation and regulating system having in combination a direct current dynamoelectric machine serving as an exciter and suitable static devices responsive to the regulated characteristic for controlling the direct current exciter, since the response of the exciter is relatively slow.

According to the present invention, many of the disadvantages of the excitation and regulating systems heretofore used are obviated. The system of this invention provides an alternating current dynamoelectric machine which is preferably capacitor excited serving as an exciter to supply excitation current through suitable rectifiers to the field winding of an alternator. The system is mechanically desirable in that no commutator or slip rings are required for the exciter which may be designed with short axial length and increased diameter so that it may be used as an overhung exciter not requiring additional bearings. The alternating current exciter in this system, moreover, inherently is quick acting and the system also utilizes magnetic amplifiers in the regulating circuit which are relatively small and are designed to have relatively small time constants so that the entire system has a relatively high speed of response.

It is therefore an object of this invention to provide an improved excitation and regulating system for a dynamoelectric machine which system has a high speed of response.

Another object of the invention is to provide an improved excitation and regulating system for alternating current dynamoelectric machines which system is both economical and quick acting.

Another object of the invention is to provide a dynamoelectric machine excitation system including a dynamoelectric machine serving as an exciter which does not require a commutator or slip rings.

Another object of the invention is to provide an alternating current electric generator with an excitation and regulating system including a capacitor excited alternating current generator serving as an exciter whose voltage does not collapse due to any transient current in the field of the alternator or due to a sudden change in voltage in its alternating current circuit.

Objects and advantages other than those above stated will be apparent from the following description when read in connection with the accompanying drawing, in which.

Figure 1:
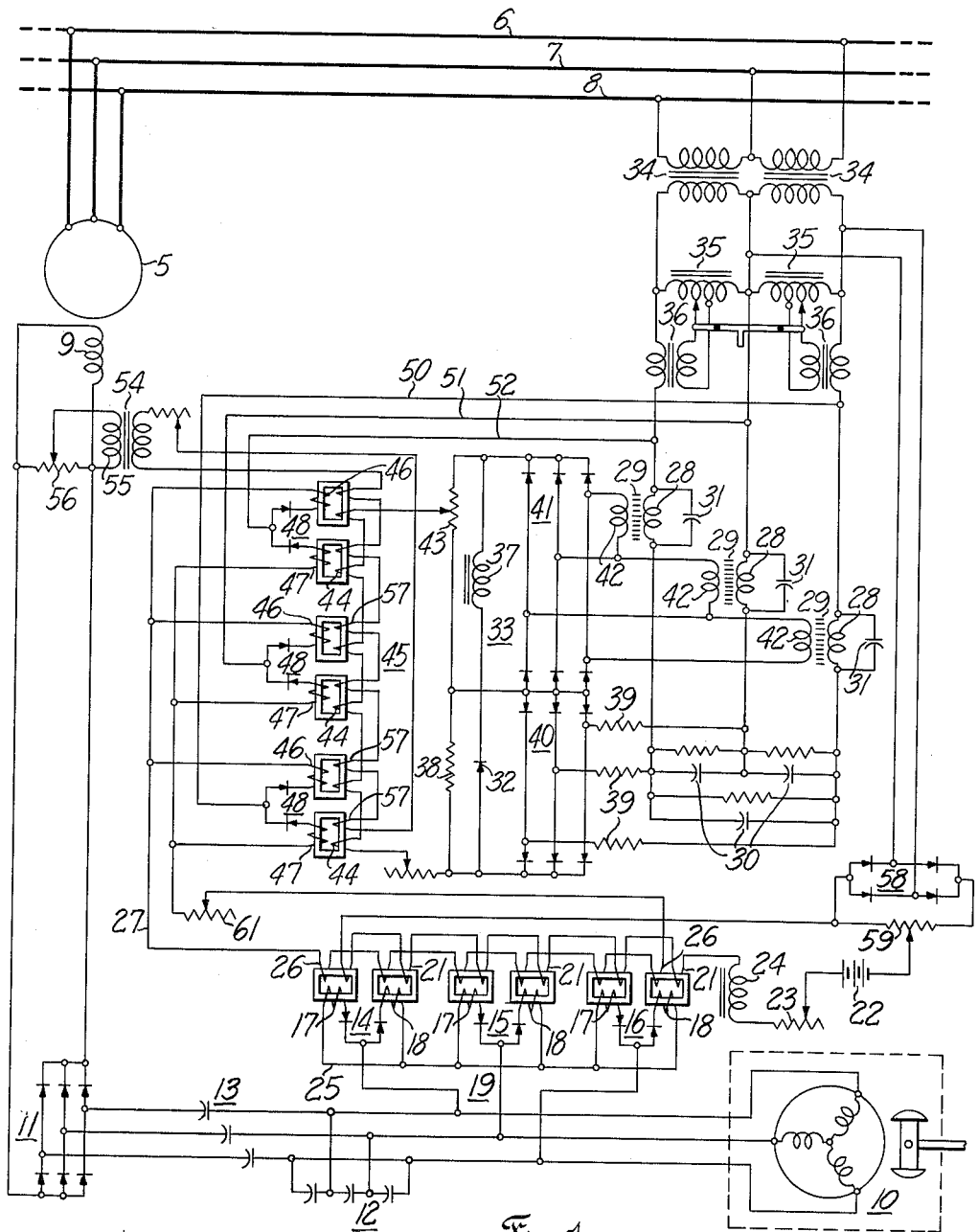
Fig. 1 is a diagrammatic representation embodying the apparatus and circuits of this invention.

Referring to Fig. 1 the invention is shown in a system for controlling an electrical characteristic such as the voltage of a dynamoelectric machine 5 which supplies alternating current to a load circuit represented by conductors 6, 7 and 8. Machine 5 may operate at any suitable frequency, such as sixty cycles per second, and is provided with a field winding 9, the energization of which is supplied by a dynamoelectric machine 10. Machine 10 is an alternating current generator and may be of any known type, but is preferably of the reluctance, permanent magnet, or hysteresis type and may have any number of phases, preferably three. Generators having unwound laminated rotors are preferred because the terminal voltage responds faster to changes in excitation in such generators than in those having solid masses and closed circuits in which currents are induced by changes in flux. A suitable three phase rectifier 11 connects the three phase armature circuit of generator 10 to the field circuit of generator 5.

The generator 10 may be driven by any suitable means but is preferably mounted on the shaft of the main generator 5 in the known manner of an overhung direct current exciter. Generator 10 is excited in any suitable manner, the excitation current being preferably supplied by capacitors 12 connected in shunt with the armature terminals of generator 10 and by capacitors 13 connected in series therewith, so as to obtain excitation which is proportional to the terminal voltage. Series capacitors 13 improve the power factor of the circuit and prevent collapse of the terminal voltage of generator 10 due to short circuit in circuit 6, 7, 8. The capacitors supply lagging magnetizing current to generator 10 by drawing leading charging current therefrom.

The frequency of the output of generator 10 with salient rotor poles, as in the case of a reluctance generator, is proportional to the rotor speed times the number of pole pairs. If generator 10 is an induction generator without salient poles its frequency is proportional to the rotor speed minus the slip speed. If generator 10 is a reluctance generator having a rotor notched to provide fourteen poles and overhung on a 3600 R. P. M. turbine generator it has a frequency of 420 cycles per second which is considerably higher than the frequency of generator 5.

In an alternating current generator operating at a frequency $f$, the root-mean-square voltage E induced in an armature winding having N turns depends upon the maximum armature magnetic flux $\phi_m$.

Their relation is:
$$E = 4.44 f \phi_m \, 10^{-8}$$
which may be rewritten
$$\phi_m = \frac{E \, 10^8}{4.44 f}$$

These relations show that if generator 10 supplies the desired voltage when operating at the frequency of machine 5, the same voltage may be obtained by increasing the frequency of generator 10. However, the maximum flux $\phi_m$ of the generator must then be reduced in the same proportion. The frequency of generator 10 is preferably not less than twice the frequency of machine 5.

This flux reduction is generally obtained by reducing the cross section of the magnetic material of the generator, thereby increasing the speed of response of the generator as is well known.

Figure 2:
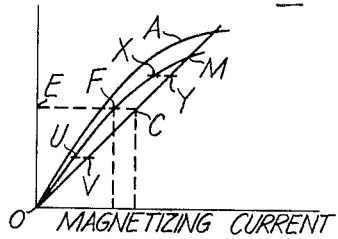
Fig. 2 is a graph, the curves of which represent characteristics of a capacitance exciter generator.

An induction generator with static capacitors connected in shunt across its terminals builds up its voltage in a manner similar to the build up of the voltage of a direct current shunt generator. The value of the build up voltage is determined by the saturation curve of the machine and by the capacitive reactance in the circuit. Fig. 2 shows typical curves for machine 10, such as the no load saturation characteristic OA, a fixed resistance saturation characteristic OFM, and a straight line OCM through the origin whose slope represents the capacitive reactance of the capacitors in the circuit. The build up of the terminal voltage of machine 10 when connected to a fixed resistance load, such as the field winding 9 of machine 5, is shown in Fig. 2. The maximum voltage of machine 10 for such fixed resistance load is the intersection M of the load line OFM and of the capacitance line OCM.

For varying the output voltage of machine 10 and thus the excitation current it supplies to the field winding 9, the value of the magnetizing current supplied to machine 10 is varied by regulating means comprising a magnetic amplifier 19 comprising inductive reactors 14 to 16 having reactance windings 17 and 18 connected in shunt with the armature terminals of machine 10. The reactance of windings 17 and 18 is varied in response to variations in the voltage of generator 5.

For a given terminal voltage E of machine 10, Fig. 2, machine 10 requires a magnetizing current corresponding to point F in the load characteristic. At terminal voltage E capacitors 12 and 13 supply a magnetizing current corresponding to point C in the capacitance line. The difference, FC, between the magnetizing current the capacitors can supply to machine 10 and that required to maintain a terminal voltage E is consumed by the shunt reactance windings of magnetic amplifier 19. U, V and X, Y represent the reactive currents in magnetic amplifier 19 for lower and higher terminal voltages respectively of machine 10. FC represents the maximum reactive current that must be consumed by magnetic amplifier 19, which current value is but a fraction of the value of magnetizing current required by machine 10 when loaded to generate maximum terminal voltage.

Reactance windings 17 and 18 of each reactor of magnetic amplifier 19 are connected in parallel with each other through half wave rectifiers oppositely connected with respect to current flow through the windings to provide self-saturation of the reactor cores. The parallel connected reactance windings 17 and 18 of reactor 14 are Y connected with the parallel connected reactance windings 17 and 18 of reactors 15 and 16 and the terminals of generator 10. Thus all windings 17 and 18 have a common terminal 25 and each phase winding of machine 10 is shunted by a reactance winding 18 in series with a reactance winding 17 at every instant of the voltage cycle.

The cores of magnetic amplifier 19 are each provided with a bias winding 21 and these windings 21 are connected in series with each other and with a source of unidirectional voltage 22 and an adjustable resistor 23. A reactor 24 is also connected in series in this circuit for protection against alternating current which may be induced therein.

The cores of magnetic amplifier 19 each also have a control winding 26. These windings are series connected to form a control circuit 27 which receive control current to vary the saturation of the cores to vary the reactance of windings 17 and 18.

Means responsive to the variations in the voltage of machine 5 to supply control current to control windings 26 includes a regulator 33 which supplies a control voltage having a polarity and a magnitude dependent on the direction and magnitude of the variations in the voltage of machine 5. The regulator may be of any suitable type, but is shown as the regulator disclosed in Patent No. 2,576,646. This regulator comprises a plurality of nonlinear resonant circuits, each circuit comprising the primary winding 28 of a saturable transformer 29 connected in series with a capacitor 30. Each winding 28 may be shunted by a small capacitor 31 for sharpening the point of resonance of the nonlinear circuits. One such nonlinear circuit is provided in each phase of the system and the circuits are energized by a measure of the voltage of machine 5 through transformers 34 connected to conductors 6, 7 and 8, autotransformers 35 and booster transformers 36.

Capacitors 30 are connected to a resistor 38 through voltage reducing resistors 39 and a three phase rectifier 40 to impress on resistor 38 a rectified voltage proportional to the average of the voltages of capacitors 30. A similar three phase rectifier 41 is connected across secondary windings 42 of saturable transformers 29 to produce another rectified voltage which is proportional to the average of the voltages of primary windings 28 and which is impressed on a resistor 43. Rectifiers 40 and 41 are connected so the voltage of resistor 38 opposes the voltage of resistor 43. The control voltage of the regulator then is the voltage across resistor 38 and an adjustable portion of resistor 43 through an adjustable tap on resistor 43. This control voltage, which varies in polarity and in magnitude dependent on variations in the regulated voltage of machine 5 from a predetermined value, may be impressed directly on the control windings 26 of magnetic amplifier 19, but is preferably impressed as shown on series connected control windings 44 of a magnetic preamplifier 45. A rectifier 32 and a reactor 37 may be connected across the noncommon terminals of resistors 38 and 43 to provide means for limiting the amplitude of the control voltage applied to the preamplifier in a direction tending to decrease the excitation of machine 5.

The preamplifier 45 comprises suitable saturable reactors 48 having reactance windings 46, 47 energized from a supply circuit 50, 51 and 52 connected to generator 5 through circuit 6, 7 and 8, transformers 34, autotransformers 35 and booster transformers 36. Thus, the supply voltage for reactance windings 46 is proportional to the voltage of generator 5. Each reactor 48 has two cores each of which has a reactance winding 46 or 47.

The winding 46 of one reactor is connected in series with one of the conductors of supply circuit 50, 51 and 52, a half wave rectifier and one terminal of control circuit 27 including windings 26 with the rectifier connected for current flow from the supply circuit to the control circuit. The winding 47 of this reactor is connected in series with the same conductor of the supply circuit, a half wave rectifier and the other terminal of the control circuit, with the rectifier in this circuit oppositely connected for circuit flow from the control circuit to the supply circuit 27.

The reactance windings 46, 47 of each of the other reactors 48 are similarly connected to another of the conductors of the supply circuit and of the control circuit, whereby reactance windings 46 are connected in Y to the supply circuit, reactance windings 47 are also connected in Y to the supply circuit, and the control circuit 27 is connected between the common terminals of the Y connected reactance windings. The voltage of control circuit 27 is determined by the voltage of supply circuit 50, 51 and 52 and the voltage across the reactance windings of the preamplifier. The preamplifier reactance voltage is varied by the action of regulator 33.

To further the speed of response of the system, a bias voltage dependent only on the voltage of machine 5 is impressed on the bias windings 21 of magnetic amplifier 19. Such voltage is obtained by means of a full wave rectifier 58 whose alternating current terminals are connected across a secondary winding of transformer 34 and whose direct current terminals are shunted by a resistor 59. One terminal of resistor 59 and an adjustable tap thereon connect an adjustable portion of resistor 59 in series with bias windings 21 and the source 22 of bias voltage.

Suitable damping means, such as a transformer 54 having a primary winding 55 connected across field winding 9, or, as shown, across a portion of a resistor 56 shunting the field winding, and a secondary winding connected to preamplifier control windings 57, are provided to prevent hunting of the system. A resistor 61 added to the control circuit 27 increases the speed of response of magnetic amplifier 19.

In operation, when a normal or predetermined voltage is present in the load circuit 6, 7 and 8 of machine 5, regulator 33 does not supply any voltage to control windings 44 of the preamplifier. Without current in control winding 44 the preamplifier supplies a predetermined current to control windings 26. This control current in windings 26 is in a direction to add to the saturation of the cores of magnetic amplifier 19 caused by the self-saturating reactance windings 17 and 18. Current in bias windings 21 is in a direction to decrease saturation of the cores, and the value of such current is chosen so that each of the reactors 14 to 16 of magnetic amplifier 19 is operated at the desired point in its saturation characteristic. The saturable reactors 48 of the preamplifier 45 and the saturable reactors 14 to 16 of magnetic amplifier 19 are operated near the knee of their saturation characteristics so that very little change in the control current effects considerable change in the current in the output or reactance windings.

When the regulated voltage of machine 5 increases above the normal value, regulator 33 supplies a control voltage of predetermined polarity to windings 44 of preamplifier 45 to cause a relatively large increase in its output current, which in turn causes a relatively large increase in the output current of magnetic amplifier 19. Such change in the output current of magnetic amplifier 19 is initiated by the change in bias current in windings 21 due to the change of voltage on rectifier 58 and resistor 59. The increase in the output current of magnetic amplifier 19 causes a decrease in the magnetizing current that capacitors 12 and 13 supply to machine 10 which results in a decrease in its terminal voltage. The lower voltage of machine 10 decreases the excitation current it supplies to field winding 9 of machine 5 to cause a decrease in the voltage of machine 5.

Conversely, when the regulated voltage of machine 5 decreases below normal, regulator 33 supplies a control voltage of reversed polarity to decrease the output of preamplifier 45 and to cause a decrease in the output of amplifier 19. The decrease in the output of amplifier 19 is initiated by decrease in the voltage across resistor 59 due to the decrease in the voltage of machine 5. Such decrease in output current in magnetic amplifier 19 causes a rise in the voltage of machine 10 which therefore supplies more excitation current to machine 5 to raise its voltage.

Although but one embodiment of the present invention has been shown and described, it will be apparent to those skilled in the art that various changes and modifications may be made therein without departing from the spirit of the invention or from the scope of the appended claims.

It is claimed and desired to secure by Letters Patent:

1. In a regulating system for controlling an electrical characteristic of a dynamoelectric machine having a field winding, the combination of an alternating current generator, rectifying means connecting said generator to said field winding to supply excitation current thereto, said generator operating at a frequency substantially greater than the frequency of said dynamoelectric machine for increasing the speed of response of the system, and means connected to said dynamoelectric machine responsive to the regulated characteristic thereof controlling said generator to cause said generator to vary the excitation current supplied to said field winding.

2. In a system for controlling an electrical characteristic of a dynamoelectric machine having a field winding, the combination of an alternating current generator, said generator having a stator winding, means connected to said stator winding to supply magnetizing current thereto, rectifying means connecting said stator winding to said field winding whereby said generator serves as an exciter for said dynamoelectric machine, said generator operating at a frequency substantially greater than the frequency of said dynamoelectric machine, and means connected to said dynamoelectric machine responsive to the regulated characteristic thereof to vary said magnetizing current to cause said generator to vary the excitation current supplied to said field winding.

3. In a system for controlling an electrical characteristic of a dynamoelectric machine having a field winding, the combination of an alternating current generator serving as an exciter for said dynamoelectric machine and operating at a frequency substantially greater than the frequency of said dynamoelectric machine, said generator having a stator winding, a capacitor connected to said stator winding to supply magnetizing current thereto, rectifying means connecting said stator winding to said field winding, and a saturable reactor having a reactance winding and a control winding, said reactance winding connected across said stator winding to vary the magnetizing current supplied thereto by said capacitors, said control winding connected to said dynamoelectric machine being responsive to the regulated characteristic thereof to vary the current in said reactance winding to vary said magnetizing current to cause said generator to vary the excitation current supplied to said field winding.

4. In a system for controlling an electrical characteristic of a dynamoelectric machine having a field winding, the combination comprising a permanent magnet exciter, a capacitor connected to said permanent magnet exciter for supplying magnetizing current thereto, a rectifier connecting said permanent magnet exciter to said field winding to supply excitation current thereto, and a saturable reactor having a reactance winding and a control winding, said reactance winding connected in shunt with said permanent magnet exciter and said control winding connected to the dynamoelectric machine to be responsive to the voltage thereof to cause said permanent magnet exciter to vary the amount of excitation current supplied to said field winding.

5. In a system for controlling an electrical characteristic of a dynamoelectric machine having a field winding, the combination comprising an alternating current generator having an unwound rotor and a stator winding connected to supply excitation current to said field winding, a capacitor connected to said generator for supplying magnetizing current thereto, and a saturable reactor having a reactance winding and a control winding, said reactance winding connected across said generator for varying the magnetizing current supplied thereto, and said control winding connected to said dynamoelectric machine being responsive to said regulated characteristic for varying the reactance of said reactance winding to vary said magnetizing current to cause said generator to vary the excitation current supplied to said field winding.

6. In a system for controlling an electrical characteristic of a dynamoelectric machine having a field winding, the combination comprising an alternating current generator having a stator winding and an unwound laminated rotor, said generator serving as an exciter for said dynamoelectric machine, a capacitor connected to said stator winding to supply magnetizing current thereto, a first saturable reactor having a reactance winding and a control winding, said reactance winding of said first reactor connected across said stator winding, a second saturable reactor having a reactance winding and a control winding, said control winding of said first reactor being connected to the reactance winding of said second reactor, and said control winding of said second reactor being connected to said dynamoelectric machine to be responsive to the regulated characteristic thereof to vary said magnetizing current to cause said generator to vary the excitation current supplied to the field winding of said dynamo-electric machine.

7. In a regulating system for maintaining substantially constant the output voltage of an alternating current generator having a field winding, the combination comprising a permanent magnet exciter, a voltage reference network responsive to the output of the alternating current generator, a rectifier having input and output terminals, the output terminals being electrically connected to the field winding of the generator, the input terminals connected to receive alternating current energy from the output of the permanent magnet exciter, and a magnetic amplifier comprising a plurality of alternating current windings which receive alternating current energy from the output of the permanent magnet exciter and at least one control winding connected in circuit relation with the output of the voltage reference network.

8. In a regulating system for maintaining substantially constant the output voltage of three phase alternating current generator having a field winding, the combination comprising three phase alternating current exciter having a stator winding and a laminated unwound rotor, said exciter operating at a frequency substantially greater than the frequency of said alternating current generator, a three phase rectifier having input and output terminals, said rectifier output terminals connected to said field winding of said generator, said rectifier input terminals connected directly to said stator winding of said exciter, capacitors connected to said exciter stator winding to supply magnetizing current thereto and to prevent collapse of exciter terminal voltage upon short circuit in the output circuit of the generator, a first three phase magnetic amplifier comprising alternating current windings connected across said exciter stator winding, said first magnetic amplifier having control windings, a second three phase magnetic amplifier comprising alternating current windings connected to receive alternating current energy from the output of said generator and pass direct current to said control windings of said first magnetic amplifier, a voltage reference network responsive to the output of said generator, said second magnetic amplifier having control windings connected in circuit relation with the output of said voltage reference network to vary the output of said second magnetic amplifier to cause said alternating current windings of said first magnetic amplifier to absorb variable amounts of lagging magnetizing current from said capacitors to cause said exciter to vary its output voltage for varying the excitation current to said field winding of said generator.

References Cited in the file of this patent

UNITED STATES PATENTS

| 2,160,594 | Krebs | May 30, 1939 |
| 2,644,127 | Bradley | June 30, 1953 |